US008411419B2

(12) United States Patent
Kitano

(10) Patent No.: US 8,411,419 B2
(45) Date of Patent: Apr. 2, 2013

(54) ELECTRONIC APPARATUS TO WHICH AC ADAPTOR CAN BE CONNECTED

(75) Inventor: Katsuya Kitano, Osaka (JP)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 12/909,173

(22) Filed: Oct. 21, 2010

(65) Prior Publication Data

US 2011/0157789 A1 Jun. 30, 2011

(30) Foreign Application Priority Data

Dec. 25, 2009 (JP) ................................. 2009-295360

(51) Int. Cl.
*G06F 1/16* (2006.01)
(52) U.S. Cl. .................................................. 361/679.01
(58) Field of Classification Search ............. 361/679.01; 713/300
See application file for complete search history.

(56) References Cited

U.S. PATENT DOCUMENTS

| | | | | |
|---|---|---|---|---|
| 3,803,475 A | * | 4/1974 | Anichini | 320/135 |
| 6,255,800 B1 | * | 7/2001 | Bork | 320/115 |
| 6,571,340 B1 | * | 5/2003 | Lee | 713/300 |
| 2007/0130483 A1 | * | 6/2007 | Wu | 713/300 |
| 2009/0309426 A1 | * | 12/2009 | Hsieh et al. | 307/113 |
| 2010/0235657 A1 | * | 9/2010 | Cho | 713/300 |
| 2010/0257382 A1 | * | 10/2010 | Azancot et al. | 713/300 |

FOREIGN PATENT DOCUMENTS

| | | |
|---|---|---|
| JP | 11-215736 | 8/1999 |
| JP | 11-215737 | 8/1999 |

* cited by examiner

*Primary Examiner* — Lisa Lea Edmonds
(74) *Attorney, Agent, or Firm* — Hamre, Schumann, Mueller & Larson, P.C.

(57) ABSTRACT

In a case where a first AC adaptor with a small capacity is connected to a notebook personal computer, an electronic apparatus supplies electric power supplied from the first AC adaptor or electric power as a sum of the electric power supplied from the first AC adaptor and electric power supplied from a battery to the load (3), depending on a load state (power consumption). According to this configuration, irrespective of the amount of the power consumption at the load (3), it is possible to connect the first AC adaptor with a small capacity to the notebook personal computer so as to operate the load (3). The AC adaptor with a small capacity is downsized and reduced in weight since in general it has a smaller transformer (transforming circuit) in comparison with a large-capacity AC adaptor.

1 Claim, 4 Drawing Sheets

ELECTRONIC APPARATUS TO WHICH AC ADAPTOR CAN BE CONNECTED

BACKGROUND

1. Field

The present application relates to an electronic apparatus to which an AC adaptor can be connected.

2. Description of Related Art

An electronic apparatus such as a notebook personal computer can operate with electric power supplied from a built-in battery or electric power supplied from an commercial power source via an AC adaptor. An AC adaptor is an apparatus that transforms a voltage (for example, 100 V) of a commercial power source to a voltage (for example, 16 V) suitable for an electronic apparatus such as a notebook personal computer.

Since such an AC adaptor is carried often with a notebook personal computer, reducing the size and the weight is preferred. For reducing size and weight of the AC adaptor, for example, the size of a transformer provided to the AC adaptor may be reduced. However, since the size of the transformer relies on the rating of the electronic apparatus such as a notebook personal computer to be connected, sometimes an extremely-downsized transformer cannot be adapted to the rating of the electronic apparatus. Under the circumstances, there is a limitation in reducing the size and weight of a transformer and an AC adaptor having the same while confirming to the rating of an electronic apparatus.

JP H11-215736 A and JP H11-215737 A each discloses a power supply device where the power source for supplying electric power to an optical disk apparatus can be selected from any of a personal computer, an AC adaptor and a battery, so as to decrease the importance of the battery, thereby reducing the size and weight of the optical disk apparatus.

However, none of the power supply devices disclosed by JP H11-215736 A and JP H11-215737 A can supply appropriate electric power to the optical disk apparatus in a case where an AC adaptor having a downsized transformer is connected to the power supply device. As a result, only an AC adaptor that is not downsized or light-weight can be connected, and thus it is difficult to improve the portability for carrying the optical disk apparatus and the AC adaptor together.

SUMMARY

Therefore, with the foregoing in mind, it is an object of the present application to provide an electronic apparatus to which a transforming device and a battery can be connected. The electronic apparatus includes an input terminal to which a transforming device can be connected, and a power source circuit that supplies electric power inputted to the input terminal to a load. In a case where the voltage is lowered to a predetermined voltage value, the power source circuit supplies both the electric power inputted to the input terminal and electric power discharged from the battery, to the load.

DETAILED DESCRIPTION OF THE EMBODIMENT

Embodiment

1. Configurations of Electronic Apparatus and AC Adaptor

Figure 1:
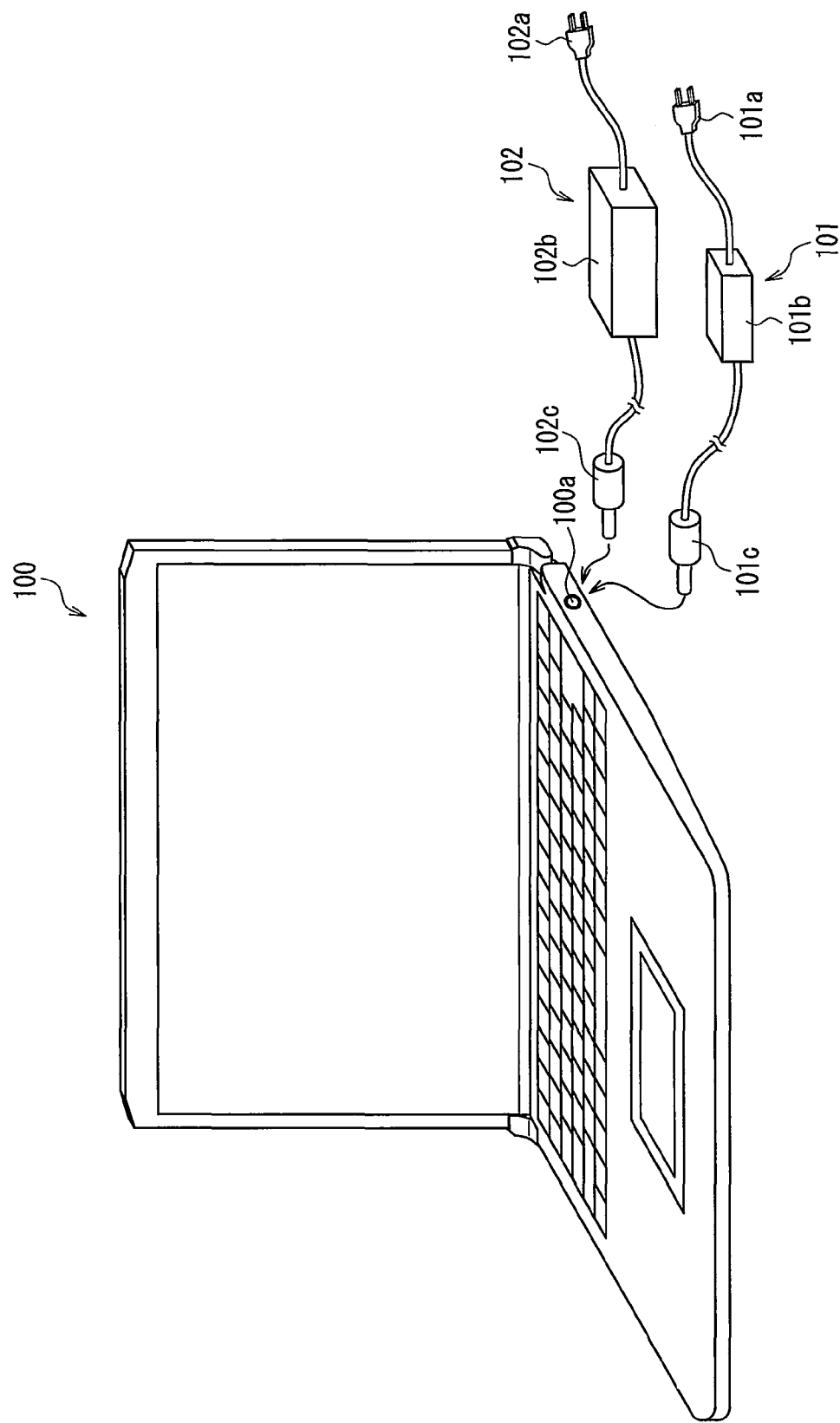
FIG. 1 is a perspective view showing an electronic apparatus and an AC adaptor.

FIG. 1 is a perspective view showing an electronic apparatus and an AC adaptor according to the present embodiment. In FIG. 1, a notebook personal computer 100 is illustrated as an example of the electronic apparatus of the present embodiment.

The notebook personal computer 100 is provided with a DC input terminal 100a. To the DC input terminal 100a, either a first AC adaptor 101 or a second AC adaptor 102 can be connected selectively.

The first AC adaptor 101 is an AC adaptor adapted to an electric power lower than the rated power of the notebook personal computer 100, for example. Namely, the first AC adaptor 101 is a small-capacity AC adaptor. The first AC adaptor 101 includes an AC input terminal 101a that can be connected to a commercial power source, a transformer 101b, and an DC output terminal 101c that can be connected to the DC input terminal 100a.

The second AC adaptor 102 is an AC adaptor adapted to the rated power of the notebook personal computer 100, for example. Namely, the second AC adaptor 102 is a large-capacity AC adaptor. The second AC adaptor 102 includes an AC input terminal 102a that can be connected to a commercial power source, a transformer 102b, and an DC output terminal 102c that can be connected to the DC input terminal 100a.

Each of the transformers 101b and 102b has a built-in transforming circuit. Since the size of the transformer is determined depending on the amount of the rated power of the AC adaptor, the transformer 101b of the first AC adaptor 101 is smaller in size than the transformer 102b of the second AC adaptor 102.

Figure 2:
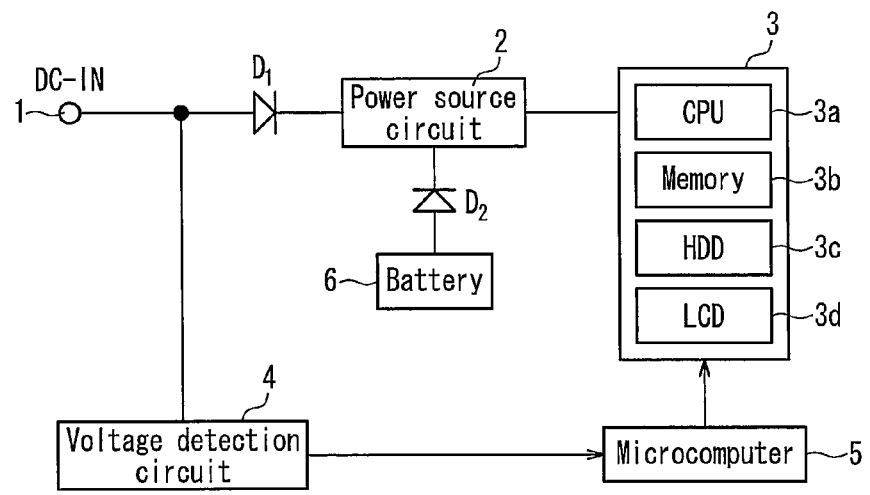
FIG. 2 is a block diagram showing the electronic apparatus.

FIG. 2 is block diagram showing the electronic apparatus (notebook personal computer 100) according to the present embodiment. The electronic apparatus as shown in FIG. 2 includes a DC input terminal 1, a power source circuit 2, a load 3, a voltage detection circuit 4, a microcomputer 5, a battery 6 and diodes D1, D2.

The DC input terminal 1 is a terminal to which either the DC output terminal 101c of the first AC adaptor 101 or the DC output terminal 102c of the second AC adaptor 102 can be connected (see FIG. 1). Namely, the DC input terminal 1 corresponds to the DC input terminal 100a in FIG. 1. To the DC input terminal 1, DC power outputted from the first AC adaptor 101 or the second AC adaptor 102 is applied.

The power source circuit 2 is a circuit that converts the voltage of the DC power applied to the DC input terminal 1 to a voltage suitable for the load 3 and that supplies the electric power to the load 3. Namely, the power source circuit 2 has a function of a DC-DC converter.

The diode D1 is connected between the DC input terminal 1 and the power source circuit 2. The diode D2 is connected between the power source circuit 2 and the battery 6. The diodes D1, D2 are the elements for switching between a state for transmitting electric power inputted to the DC input terminal 1 to the load 3, and a state for transmitting electric power as a sum of the power inputted to the DC input terminal 1 and electric power discharged from the battery 6 to the load 3. The diodes D1, D2 provided in the present embodiment can be replaced by any elements other than diodes as long as the elements provide a similar effect.

The load 3 includes a central processing unit (CPU) 3a, a memory 3b, a hard disk drive 3c, and a liquid crystal display (LCD) 3d. It should be noted that the components included in the load 3 are those to be built in a typical notebook personal computer, which are not limited to the example as shown in FIG. 2.

The voltage detection circuit 4 is a circuit for detecting the voltage of the DC input terminal 1 and transmitting the voltage value to the microcomputer 5.

The microcomputer 5 controls the operations of the load 3 on the basis of the voltage value transmitted from the voltage detection circuit 4. It should be noted that the operation control of the load 3 by the microcomputer 5 is not essential but optional in the present application.

The battery 6 is capable of supplying DC power to the notebook personal computer 100. The battery 6 of the present embodiment is a rechargeable battery that can be attached to and detached from the notebook personal computer 100. The battery 6 can be charged on the basis of the electric power to be inputted to the DC input terminal 1 via the AC adaptor.

Figure 3:
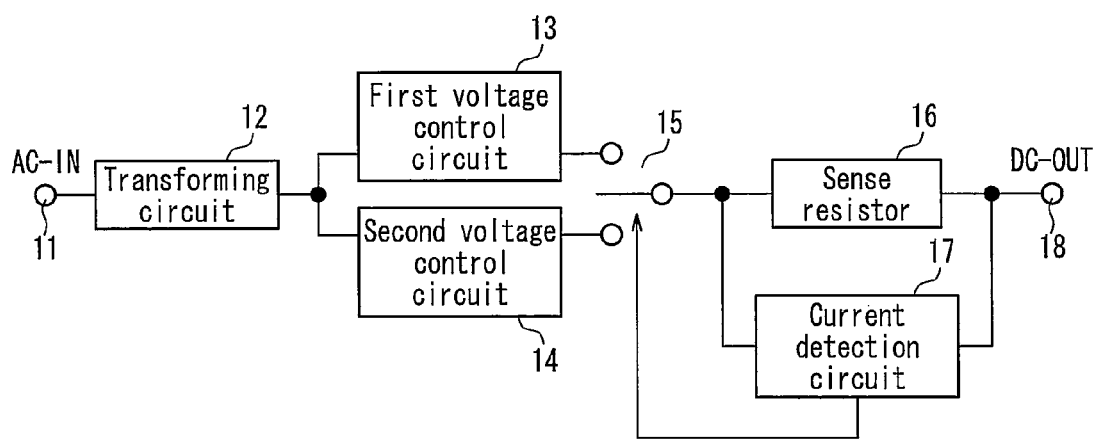
FIG. 3 is a block diagram showing the AC adaptor.

FIG. 3 is a block diagram showing a transforming device according to the present embodiment. In the present embodiment, an AC adaptor is illustrated as an example of the transforming device. The AC adaptor shown in FIG. 3 is configured, for example, as the first AC adaptor 101 in FIG. 1. The AC adaptor as shown in FIG. 3 includes an AC input terminal 11, a transforming circuit 12, a first voltage control circuit 13, a second voltage control circuit 14, a switch 15, a sense resistor 16, a current detection circuit 17 and a DC output terminal 18.

The AC input terminal 11 can be connected to a commercial power source. To the AC input terminal 11, AC power from the commercial power source is inputted.

The transforming circuit 12 is a circuit that transforms the voltage of the AC power inputted to the AC input terminal 11 to a predetermined DC voltage. Namely, the transforming circuit 12 has a function of AC-DC converter.

The first voltage control circuit 13 is a circuit that transforms the output voltage of the transforming circuit 12 to a first voltage Va. In the present embodiment, the first voltage Va is set to 16 V.

The second voltage control circuit 14 is a circuit that transforms the output voltage of the transforming circuit 12 to a second voltage Vb. In the present embodiment, the second voltage Vb is set to 10 V. Here, the values of the first voltage and the second voltage are not limited to this example, as long as the values are different from each other.

The switch 15 is connected to either the first voltage control circuit 13 or the second voltage control circuit 14 due to the control by the current detection circuit 17.

The sense resistor 16 is connected between the switch 15 and the DC output terminal 18, and used for detecting the current of the current detection circuit 17.

The current detection circuit 17 is connected in parallel between the input side and the output side of the sense resistor 16 so as to detect the current value on the basis of the potential difference between the input side and the output side of the sense resistor 16.

The DC output terminal 18 can be connected to the DC input terminal 1 of the notebook personal computer 100 (see FIG. 2).

2. Power Supply Operation

Figure 4:
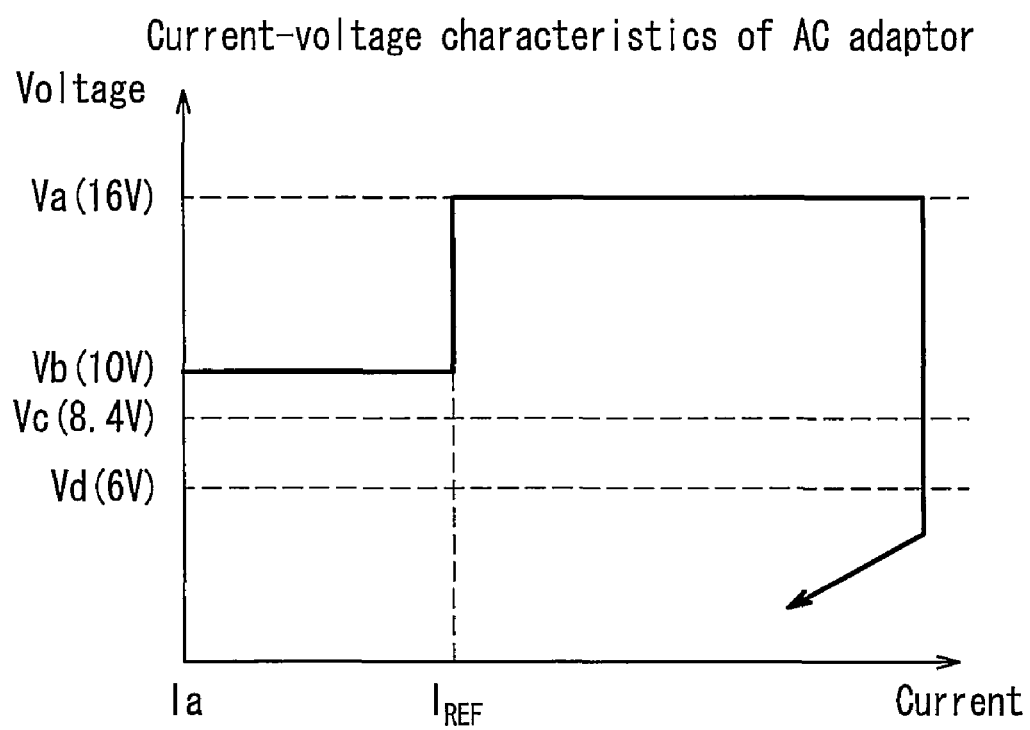
FIG. 4 is a graph showing voltage characteristics of the AC adaptor.
Figure 5:
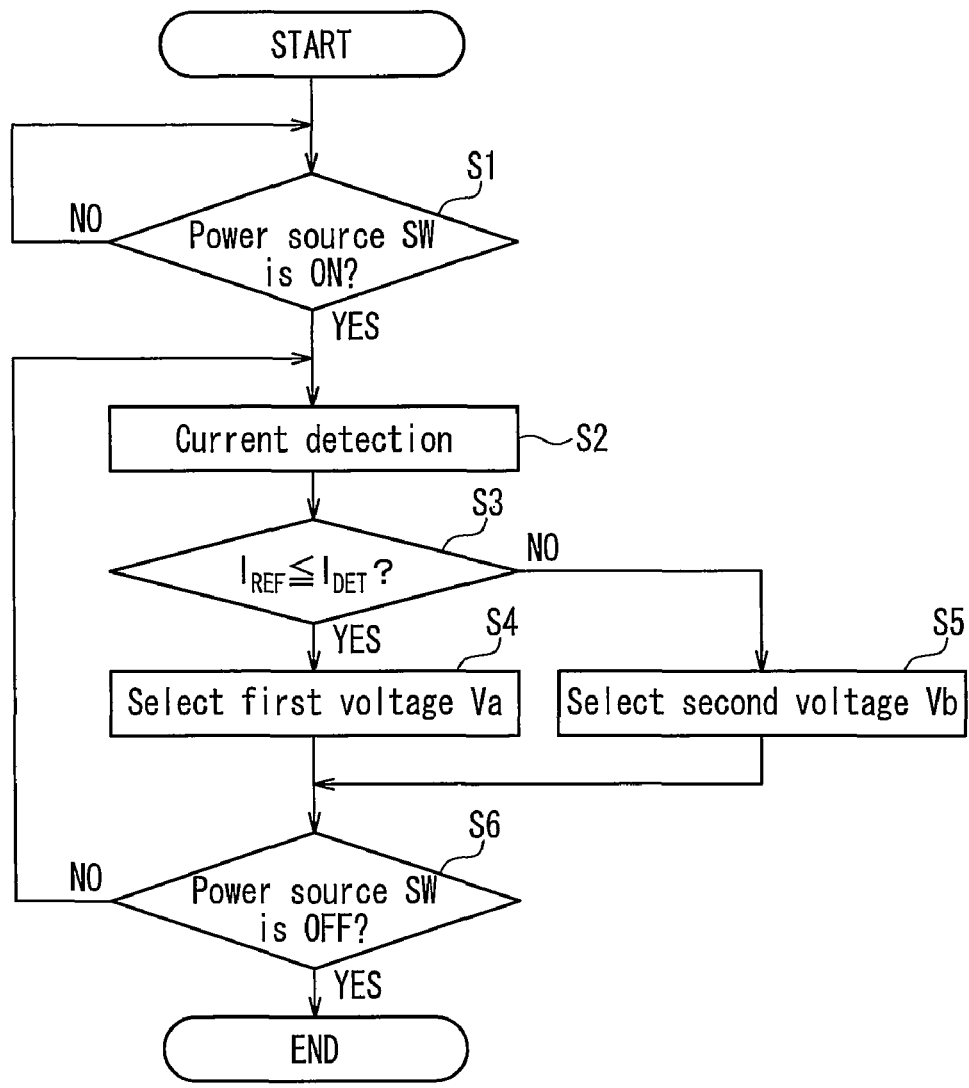
FIG. 5 is a flow chart showing a flow of operation in the AC adaptor.

FIG. 4 is a graph showing the current-voltage characteristics of the first AC adaptor 101. Specifically, this graph shows the relationship between the current value detected by the current detection circuit 17 and the voltage at the DC output terminal 18. FIG. 5 shows an operation flow in the first AC adaptor 101.

First, the DC output terminal 18 of the first AC adaptor 101 and the DC input terminal 1 of the notebook personal computer 100 are connected to each other. Next, the AC input terminal 11 of the first AC adaptor 101 is connected to a commercial power source. And when the notebook personal computer 100 comes to a state of being capable of receiving electric power (YES decision in S1 of FIG. 5), the first AC adaptor 101 is supplied with electric power via the AC input terminal 11.

Here, the "state where the notebook personal computer 100 is capable of receiving electric power" indicates, for example, a state where the power source switch in the electronic apparatus (notebook personal computer 100) is switched from OFF to ON, a state where the electronic apparatus (notebook personal computer 100) is capable of charging a rechargeable battery (for example, the battery 6) connected to the electronic apparatus itself, and a state where the loading current or the load state at the electronic apparatus (notebook personal computer 100) has changed. The present embodiment refers to a state where the power source switch (not shown) of the notebook personal computer 100 has been switched from OFF to ON.

The transforming circuit 12 transforms the voltage of electric power inputted to the AC input terminal 11 to a predetermined voltage. The first voltage control circuit 13 transforms the output voltage of the transforming circuit 12 to the first voltage Va. The second voltage control circuit 14 transforms the output voltage of the transforming circuit 12 to the second voltage Vb. After the power source switch is switched from OFF to ON, the switch 15 is switched from the second voltage control circuit 14 side to the first voltage control circuit 13 side and thus the voltage at the voltage terminal of the switch 15 becomes 16 V. As a result, the voltage at the DC output terminal 18 also becomes 16 V.

Next, the current detection circuit 17 detects the current on the basis of the potential difference between the both ends of the sense resistor 16 (S2 in FIG. 5). At this time, the current detection circuit 17 controls the switching operation of the switch 15 (S3 in FIG. 5) on the basis of the characteristics as shown in FIG. 4. Namely, the current detection circuit 17 compares the detected current value $I_{DET}$ and a reference current value $I_{REF}$. When the current value $I_{DET}$ is lower than the reference current value $I_{REF}$ ($I_{REF} > I_{DET}$), the current detection circuit 17 controls the switch 15 so as to be connected to the second voltage control circuit 14 side (S5 in FIG. 5), and when the current value $I_{DET}$ is equal to or higher than the reference current value $I_{REF}$ ($I_{REF} \leq I_{DET}$), the current detection circuit 17 controls the switch 15 so as to be connected to the first voltage control circuit 13 side (S4 in FIG. 5). Here, the "reference current value $I_{REF}$" is set to 100 mA for example.

After the power source switch of the notebook personal computer 100 is switched from OFF to ON, the value of current running in the first AC adaptor 101 rises gradually. The current detection circuit 17 continues to compare the detected current value $I_{DET}$ and the reference current value $I_{REF}$. When the current value $I_{DET}$ becomes equal to or higher than the reference current value $I_{REF}$ (YES decision in S3 of FIG. 5), the current detection circuit 17 controls the switch 15 to be switched to the first voltage control circuit 13 side (S4 in FIG. 5). In the graph as shown in FIG. 4, when the current value $I_{DET}$ becomes equal to the reference current value $I_{REF}$, the switch 15 is switched to the first voltage control circuit 13 side. As a result, the voltage at the DC output terminal 18 becomes the first voltage (16 V).

Namely, in a case where the power source of the notebook personal computer 100 has been switched from OFF to ON, at the first AC adaptor 101 of the present embodiment, the voltage of the DC output terminal 18 becomes the second voltage Vb and subsequently the voltage changes to the first voltage Va different from the second voltage Vb. In the meantime, even in a case where the power source of the notebook personal computer 100 has been switched from OFF to ON, at the second AC adaptor 102, the voltage of the DC output terminal 18 is set to a certain value (for example, 16 V).

Next, electric power based on the voltage changing as shown in FIG. 4 is inputted to the DC input terminal 1 of the notebook personal computer 100. The power source circuit 2 transforms the electric power to be inputted to the DC input terminal 1 and supplies the electric power to the respective devices included in the load 3. At this time, the voltage of the DC input terminal 1 is lowered (see FIG. 4) as the first AC adaptor 101 is connected to the notebook personal computer 100 and the power consumption at the load 3 is increased. In the present embodiment, as shown in FIG. 2, the diode D1 is connected between DC input terminal 1 and the power source circuit 2, and the diode D2 is connected between the power source circuit 2 and the battery 6. Therefore, when the voltage is lowered to the range of Vc to Vd as shown in FIG. 4, electric discharge from the battery 6 to the power source circuit 2 starts. The power source circuit 2 supplies to the load 3 with the electric power as a sum of the electric power supplied from the DC input terminal 1 and the electric power supplied from the battery 6. Namely, when the power consumption at the load 3 increases and thus the operation with only the electric power supplied from the first AC adaptor 101 may be difficult, the electric power discharged from the battery 6 will be supplied together to the load 3, thereby compensating the operation at the load 3. Though the voltage Vc is 8.4 V and the voltage Vd is 6 V in the present embodiment, the voltage values are not limited to these examples.

When the power consumption at the load 3 is lowered, the terminal voltage at the DC input terminal 1 rises. This results in a state where the electric discharge from the battery 6 stops and the electric power supplied via the first AC adaptor 101 is supplied to the load 3.

In this manner, irrespective of the amount of power consumption at the load 3, it is possible to connect the first AC adaptor 101 with a small capacity to the notebook personal computer 100 so as to operate the load 3. As shown in FIG. 1, the transformer 101*b* of the first AC adaptor 101 with a small capacity is smaller in size than the transformer 102*b* of the second AC adaptor 102 with a large capacity. As a result, the first AC adaptor 101 itself is downsized and is light-weight to have excellent portability.

The voltage detection circuit 4 detects the voltage at the DC input terminal 1, and transmits the voltage value to the microcomputer 5. When detecting that the voltage value is kept at the first voltage Va and is not changed, the microcomputer 5 decides that "the connected AC adaptor is the second AC adaptor 102". On the other hand, when detecting that the value of voltage transmitted from the voltage detection circuit 4 changes as shown in FIG. 4, namely, detecting that a second voltage Vb exists, the microcomputer 5 decides that "the connected AC adaptor is the first AC adaptor 101". Namely, the microcomputer 5 can decide the type of the connected AC adaptor on the basis of the change in the voltage value at the DC input terminal 11.

The microcomputer 5 can restrict the operation at the load 3 for example, on the basis of the decision on the type of the AC adaptor. Examples of the operations at the load 3 to be restricted include an operation for making the load at the CPU 3*a* to be 100%, an operation of the disk drive that can carry out information writing on the optical disk or the like, an information communication operation via USB (Universal Serial Bus), and an image display operation by a three-dimensional graphic board. By restricting these operations, the power consumption of the load 3 can be suppressed. Examples of operations not being restricted by the above-described load restriction include a character input operation with use of document processing application software, an Internet connection operation, and an electronic mail transmission-reception operation.

Later, the microcomputer 5 controls the power source circuit 2 so as to supply electric power from the first AC adaptor 101 to the load 3.

In the present embodiment, the rated power of the first AC adaptor 101 is set to be 30 W or lower for example. The rated power of the second AC adaptor 102 is set to be 80 W for example. The rated power of the battery 6 is set to be 60 W to 80 Wh for example. The power consumption in a low-load state at the load 3 is set to be lower than 30 W for example. The power consumption in a high-load state at the load 3 is set to be 30 to 80 W for example.

In a case where the second AC adaptor 102 (rated 80 W) is connected, the notebook personal computer 100 can supply electric power (60 to 80 W) to the load 3 so as to operate the load 3 in a high-load state, without addition of the electric power from the battery 6. In a case where the first AC adaptor 101 (rated 30 W) is connected and the load 3 is in a low-load state (the power consumption is not higher than 30 W), the notebook personal computer 100 can operate the load with the electric power supplied from the first AC adaptor 101. In a case where the first AC adaptor 101 (rated 30 W) is connected and the load 3 is in a high-load state (the power consumption is higher than 30 W), it is difficult to operate the load 3 with only the electric power supplied from the first AC adaptor 101. Thus the notebook personal computer 100 supplies also the electric power from the battery 6 to the load 3.

3. Effect of the Embodiment, and the Others

According to the present embodiment, in a case where the first AC adaptor 101 with a small capacity is connected to the notebook personal computer 100, the load 3 is supplied with electric power from the first AC adaptor 101 or electric power as a sum of the electric power from the first AC adaptor 101 and the electric power from the battery 6, depending on the state of the load 3 (power consumption). This configuration allows the connection of the first AC adaptor 101 with a small capacity to the notebook personal computer 100 so as to operate the load 3 irrespective of the amount of the power consumption at the load 3.

The first AC adaptor 101 with a small capacity is small in size and light-weight since it often has a smaller transformer (transforming circuit) in comparison with the second AC adaptor 102 with a large capacity. Therefore, the portability in carrying the notebook personal computer 100 and an AC adaptor together can be improved.

It should be noted that the rated powers of the notebook personal computer 100, the first AC adaptor 101 and the second AC adaptor 102 are not limited to the examples in the present embodiment. Further, the power consumptions in the high-load state and the low-load state at the load 3 are not limited to the examples in the present embodiment. The transformer 101*b* of the first AC adaptor 101 can be downsized further by further lowering the rated power of the first AC adaptor 101.

Though the present embodiment refers to a configuration of deciding the type of AC adaptor on the basis of a change in voltage at the DC input terminal 1 (the change from the voltage Vb to the voltage Va for example), this configuration is not essential. The key of the present embodiment is the switchover between supplying the electric power from the AC adaptor to the load and supplying electric power as a sum of the electric power from the AC adaptor and the electric power from the battery, depending on the change in the terminal voltage at the DC input terminal (for example, the change from the voltage Va to the voltages Vc-Vd in FIG. 4) that changes depending on the operation state of the load.

The electronic apparatus is not limited to the notebook personal computer 100 described in the present embodiment, but any electronic apparatus can be used as long as an AC adaptor and a battery can be connected thereto. Examples of the electronic apparatuses other than the notebook personal computer include a personal digital assistant (PDA), a portable game machine, a video camera and the like.

The transforming devices of the present application are not limited to the first AC adaptor 101 and the second AC adaptor 102 in the present embodiment. The electronic apparatus of the present application is not limited to the notebook personal computer 100 in the present embodiment. The input terminal of the present application is not limited to the DC input terminal 1 in the present embodiment. The load of the present application is not limited to the load 3 in the present embodiment. And the power source circuits of the present application are not limited to the power source circuit 2, the diodes D1 and D2 in the present embodiment.

The present application is applied favorably to an electronic apparatus to which a downsized and light-weight AC adaptor having a downsized transforming device can be connected.

The application may be embodied in other forms without departing from the spirit or essential characteristics thereof. The embodiments disclosed in this application are to be considered in all respects as illustrative and not limiting. The scope of the application is indicated by the appended claims rather than by the foregoing description, and all changes which come within the meaning and range of equivalency of the claims are intended to be embraced therein.

What is claimed is:

1. An electronic apparatus to which a transforming device and a battery can be connected, comprising:
    an input terminal to which the transforming device can be connected;
    a power source circuit connected to the input terminal;
    a voltage detection circuit connected to the input terminal and configured to determine a voltage at the input terminal; and
    a load connected to the power source,
    wherein the power source circuit is configured to supply electric power inputted to the input terminal to the load,
    wherein the power source circuit is configured to supply electric power as a sum of the electric power inputted to the input terminal and electric power discharged from the battery to the load when the voltage detection circuit determines that the voltage at the input terminal is lowered to a predetermined voltage level, and
    wherein the power source circuit is configured to supply the electric power inputted to the input terminal when the voltage detection circuit determines that the voltage at the input terminal above a predetermined voltage level.

* * * * *